United States Patent Office 3,449,433
Patented June 10, 1969

PROCESS FOR PREPARING 2-[TRIS(DIFLUOROAMINO)METHOXY]ETHYLAMINE PERCHLORATE

Claude E. Merrill, Midland, Mich., assignor to The Dow Chemical Company, Midland, Mich., a corporation of Delaware
No Drawing. Filed Dec. 2, 1965, Ser. No. 512,040
Int. Cl. C07c 93/02
U.S. Cl. 260—584        4 Claims This invention relates to the preparation of a fluorine-nitrogen containing organic compound and more particularly is concerned with an improved process for preparing 2-[tris(difluoroamino)methoxy]ethylamine perchlorate corresponding to the formula $$(NF_2)_3COCH_2CH_2NH_3{}^+ClO_4{}^-$$

Heretofore, the adduct of ethanolamine perchlorate $$(HOCH_2CH_2NH_3{}^+ClO_4{}^-)$$

and perfluoroguanidine $[(NF_2)_2C=NF]$ has been prepared in the presence of a small amount of urea as catalyst using acetonitrile as a solvent and this adduct subsequently fluorinated by direct contact with fluorine in the presence of the acetonitrile to prepare 2-[tris(difluoroamino)methoxy]-ethylamine perchlorate. This process, as practiced heretofore, has a number of difficulties and problems associated therewith. Product recovery in high purity and high yield is difficult. The product as produced ordinarily must be subjected to liquid chromatography over silica gel or treated by a complex extraction process to obtain a product of purity such that it is suitable for use as an oxidizer for solid propellants. In these purification processes, because of their complexity and the multiple steps involved, recovered yields at a maximum of only about 40 percent are realized.

It is a principal object of the present invention to provide an improved process for the preparation of 2-[tris(difluoroamino)methoxy]ethylamine perchlorate.

It is also an object of the present invention to provide an improved process for preparing high purity 2-[tris difluoroamino)methoxy]ethylamine perchlorate in higher yields than realized heretofore wherein a high purity product is recovered directly from the reaction mass.

It is a further object of the present invention to provide an improved process for preparing high purity 2-[tris(difluoroamino)methoxy]ethylamine perchlorate employing a minimal number of processing steps.

These and other objects and advantages will become apparent from the detailed description presented hereinafter.

In accordance with the present novel improved process for preparing 2-[tris(difluoroamine)methoxy]-ethylamine perchlorate, ethanolamine perchlorate and perfluoroguanidine are reacted in the presence of urea as a catalyst in a nitromethane carrier. The resulting ethanolamine perchlorate-perfluoroguanidine adduct as produced is fluorinated directly in the reaction mixture. A substantially non-polar organic liquid which is miscible with nitromethane but which is substantially a non-solvent for 2-[tris(difluoroamino)methoxy]ethylamine perchlorate is added to the reaction product solution whereupon high purity 2-[tris(difluoroamino)methoxy]-ethylamine perchlorate crystallizes directly therein. The product crystals are recovered by any of a variety of liquid solid separatory techniques known to one skilled in the art. Filtration, centrifugation, flash evaporation of the liquids and the like techniques ordinarily are employed in this latter operation.

If desired, the product crystals can be washed with an inert, organic liquid which is a nonsolvent for 2-[tris (difluoroamino)methoxy]ethylamine perchlorate. Chlorofluorocarbons such as 1,1,2-trichloro-1,1,2-trifluoroethane has been found to be particularly satisfactory washing medium.

In carrying out the present novel process, perfluoroguanidine and ethanolamine perchlorate are introduced into a reaction vessel containing catalytic quantities of urea and a nitromethane carrier which is maintained at a temperature of from about minus 20 to about minus 150° C. The weight ratios of nitromethane to total adduct forming reactants usually ranges from about 1.5 to about 10 or more. The temperature of the reaction mass is raised to within the range of from about room temperature (i.e.~15 to 20° C.) to about 100° C. and maintained there for an extended period of time, usually from about 12 hours to about 168 hours or more. During this period, an adduct of perfluoroguanidine and ethanolamine perchlorate forms in the reaction mass. Subsequently, the reaction mass is cooled to a temperature of from about 0° C. to about minus 20° C. or lower and fluorine is added slowly to the cooled solution over a period of from about 0.5 to about 8 hours. After the fluorination operation has been completed, a non-polar organic liquid in quantity sufficient to precipitate the 2-[tris(difluoroamino)methoxy]ethylamine perchlorate product is added to the product solution and 2-[tris(difluoroamino)methoxy] ethylamine perchlorate precipitated therein.

In a preferred embodiment of the present novel process, perfluoroguanidine and ethanolamine perchlorate at molar proportions of from about 1.1/1 to about 1.5/1, based on that required stoichiometrically for formation of the 1/1 adduct, are added to a urea catalyst containing nitromethane reaction medium which is maintained at a temperature of from about minus 30° to about minus 135° C. The weight ratio of nitromethane to adduct forming reactants is maintained at from about 2 to about 8. Following the addition of the adduct formers, the temperature of the reaction mixture is raised to about 40 to 50° C. and the mass maintained at this temperature range from about 12 to about 48 hours. After this period, the adduct containing reaction mixture is cooled from about minus 5° C. to about minus 20° C. and fluorine at a minimum about that required stoichiometrically for production of the fluorinated product introduced therein over a period of from about 1 to about 4 hours. An excess volume of a non-polar organic liquid, preferably methylene chloride ($CH_2Cl_2$) or chloroform ($CHCl_3$) is added to the fluorinated product mixture whereupon the 2-[tris (difluoroamino)-methoxy]-ethylamine perchlorate crystallizes therefrom.

The present process can be carried out using quantities of ethanolamine perchlorate and perfluoroguanidine wherein either of these reactants is in excess of that required stoichiometrically for preparation of the adduct. However, usually at least about stoichiometric quantities, and preferably as set forth directly hereinbefore, a slight excess of the perfluoroguanidine is employed.

Those quantities of nitromethane reaction medium set forth herein usually are employed as these provide the optimum balance with respect to operability and ease of handling the reaction masses and product mixtures. In general, at a minimum, the quantity of nitromethane to be used is that which substantially completely dissolves the reactants, adduct and 2-[tris(difluoroamino)methoxy] ethylamine perchlorate product. Maximum quantities of nitromethane to be employed are those which do not result in unwieldly large volumes when diluted with the halogenated hydrocarbon during the precipitation of the fluorinated product.

Fluorine alone can be used directly in the fluorinating step. However, for optimum control of the reaction rate and to reduce handling problems during the fluorine addition, usually a mixture of fluorine and an inert gas such as, for example, nitrogen or argon is used. In these mixtures the volume percent of inert gas and fluorine used ordinarily range from about 50 to about 95 percent inert gas and 50 to about 5 percent fluorine. A 90 volume percent nitrogen-10 volume percent fluorine mixture has been found to be quite satisfactory. Usually fluorine in excess of that required stoichiometrically for preparation of the fluorinated product is used in the present process. Unreacted fluorine readily can be recovered and recycled for use in the fluorination procedure.

Of the liquid organic, substantially non-polar materials suitable for use in precipitating the 2-[tris(difluoroamino)-methoxy]ethylamine perchlorate from the reaction mass, petroleum ether, aliphatic and aromatic hydrocarbons, ethers and halogenated aliphatic hydrocarbons such as methylene chloride, chloroform, carbon tetrachloride, chlorofluorosubstituted hydrocarbons and the like usually are used. Ordinarily, the quantities of diluent employed to effect precipitation of the 2-[tris(difluoroamino)me-thoxy]ethylamine perchlorate are such to provide a mixture of non-polar liquid/nitromethane on a volume basis of at least about 10/1 and preferably from about 20/1 to about 50/1 or more.

The following examples will serve to illustrate further the present invention but are not meant to limit it thereto.

EXAMPLE 1

Ethanolamine perchlorate (~695 milligrams) and urea (~56 milligrams) were placed in a reactor with approximately 5 milliliters (~5.65 grams) of nitromethane. The resulting mixture was cooled to about minus 135° C., becoming solidified, and about 800 milligrams of perfluoroguanidine was introduced by vacuum transfer technique into the reactor onto the frozen nitromethane solution.

After the perfluoroguanidine addition was complete, the reaction mass slowly was warmed to about 50° C. The reaction vessel was maintained at the indicated temperature for about 43.5 hours.

The resulting ethanolamine perchlorate-perfluoroguanidine adduct containing solution was cooled to about minus 10° C. and a 10 percent by volume fluorine-90 percent by volume nitrogen mixture passed through the solution for about 1.5 hours at a flow rate of about 200 cubic centimeters per minute.

Following the fluorination step, the product solution was diluted with about 50 milliliters of methylene chloride. White crystals precipitated in the reaction mass.

The product crystals were removed from the residual liquid mixture. These melted at 195–197° C.

X-ray diffraction analysis gave the following data as summarized in Table I wherein $d$ represents the interplanar spacings of the planes in A. based on Miller indices and the $I/I_0$ is the relative line intensity compared to the strongest line based at 100.

TABLE I

| d | $I/I_0$ | d | $I/I_0$ |
|---|---|---|---|
| 5.34 | 81 | 3.38 | 5 |
| 5.17 | 13 | 3.27 | 23 |
| 5.08 | 10 | 3.20 | 23 |
| 4.91 | 48 | 3.11 | 13 |
| 4.62 | 58 | 2.706 | 16 |
| 4.50 | 19 | 2.667 | 26 |
| 4.15 | 19 | 2.481 | 10 |
| 4.05 | 100 | 2.332 | 5 |
| 3.93 | 26 | 2.201 | 10 |
| 3.79 | 42 | 2.154 | 10 |
| 3.59 | 48 | 2.040 | 5 |

These data are consistent for 2-[tris(difluoroamino)methoxy]ethylamine perchlorate.

Differential thermal analysis (DTA) showed an endotherm at 161.4° C. and a major decomposition exotherm at 203–9° C. Additionally, there was a broad double exotherm after the major decomposition exotherm. These data also are consistent for 2-[tris(difluoroamino)methoxy]ethylamine perchlorate.

EXAMPLE 2

For larger scale runs, a remote control reactor assembly was employed. This consisted of a heavy-walled Pyrex Fischer-Porter glass reactor fitted with sufficient outlets to allow liquid loading, perfluoroguanidine loading and gas inlet for fluorination, low pressure and nitrogen pressurization.

In general the procedure followed for these studies was that set forth for Example 1 except that the initial solution of ethanolamine perchlorate in nitromethane was not solidified prior to introducing perfluoroguanidine into the reactor. In this preparation, the nitromethane solution was agitated and maintained at about minus 30° C. and the perfluoroguanidine was introduced under reduced pressure directly therein.

Following fluorination, the nitromethane product solution was removed from the reactor, washed with several portions of water and the washed product solution concentrated by evaporation of nitromethane and then diluted with methylene chloride to provide a methylene chloride/nitromethane ratio, on a volume basis, of greater than 10. Alternatively, methylene chloride was added directly to a dilute product solution subsequent to the fluorination again in quantities sufficient to provide a methylene chloride/nitromethane ratio, on a volume basis, greater than about 10. The resulting precipiated 2-[tris(difluoroamino)methoxy]ethylamine perchlorate was recovered, washed with 1,1,2-trichloro-1,2,2-trifluoromethane and dried. Analysis of the solid white crystalline product showed this to be 2-[tris(difluoroamino)methoxy]ethylamine perchlorate.

The experimental data and results of several runs are summarized in Table II.

TABLE II

| Run No. | Ethanolamine perchlorate | Perfluoro-guanidine (grams) | Urea | Nitro-methane | Adduct Prep. | | Fluorination | | Product yield, percent |
|---|---|---|---|---|---|---|---|---|---|
| | | | | | Temp., °C. | Time, hrs. | Temp., °C. | Time, hrs. | |
| 1 | 9 | 10 | 0.5 | 70 | 42 | 48 | −20 to −15 | 1.75 | 50 |
| 2 | 15 | 18 | 1.0 | 70 | 45 | 48 | −15 to −10 | 2.0 | 48 |
| 3 | 22 | 21 | 1.4 | 70 | 45 | 48 | −8 to −10 | 40 | (¹) |

¹ Bulk of product lost through crack in reactor during transfer of liquid product solution.

In a manner similar to that described for the foregoing examples, 2-[tris(difluoroamino)methoxy]ethylamine perchlorate can be prepared by reacting perfluoroguanidine and ethanolamine perchlorate in nitromethane in the presence of urea catalyst at a nitromethane to adduct forming reactant ratio (on a weight basis) of from about 1.5 to about 10, fluorinating the resulting adduct and precipitating the 2-[tris(difluoroamino)methoxy]ethylamine perchlorate directly in the reaction mass by addition thereto of a substantially non-polar solvent such as petroleum ether, kerosene, tetrahydrofuran, diethyl ether, carbon tetrachloride, chloroform, perchloroethylene, benzene, toluene, sym-dichlorotetrafluoroethane, 1,1,2-trichloro-1,2,2-trifluoroethane and the like.

Various modifications can be made in the present invention without departing from the spirit or scope thereof for it is understood that I limit myself only as defined in the appended claims.

I claim:
1. A process for preparing 2-[tris(difluoroamino)methoxy]ethylamine perchlorate which comprises;
   (a) reacting ethylamine perchlorate and perfluoroguanidine in nitromethane in the presence of urea catalyst thereby to prepare a nitromethane solution of ethylamine perchlorate-perfluoroguanidine adduct,
   (b) fluorinating said adduct in said solution, and
   (c) adding to the resulting product solution a substantially non-polar organic liquid which is miscible with nitromethane but substantially a non-solvent for 2-[tris(difluoroamino)methoxy]ethylamine perchlorate, the quantity of said organic liquid being sufficient to precipitate said 2-[tris(difluoroamino)methoxy]ethylamine perchlorate in the reaction mass, and
   (d) separating said precipitated 2-[tris(difluoroamino)methoxy]ethylamine perchlorate from the residual liquid reaction mass.

2. The process as defined in claim 1 including the steps of reacting said perfluoroguanidine and ethanolamine perchlorate at a temperature of from about 40 to about 50° C. employing perfluoroguanidine/ethanolamine perchlorate at molar proportions ranging from about 1.1/1 to about 1.5/1 of that required stoichiometrically for formation of the 1/1 perfluoroguanidine/ethanolamine perchlorate adduct and the weight ratio of nitromethane to total amount of said adduct forming reactants in the reaction mixture ranges from about 1.5 to about 10.

3. The process as defined in claim 1 wherein about a 90 volume percent nitrogen-10 volume percent fluorine mixture is employed as a fluorinating agent and the fluorination is carried out at a temperature of from about 0 to about minus 20° C.

4. The process as defined in claim 1 wherein the substantially non-polar organic liquid precipitant for said 2-[tris(difluoroamino)methoxy]ethylamine perchlorate is methylene chloride and the amount of said methylene chloride/nitromethane in the reaction mass on a volume basis at a minimum is about 10/1.

References Cited

UNITED STATES PATENTS 3,149,165   9/1964   Sausen _____ 260—583

LELAND A. SEBASTIAN, *Primary Examiner.*

U.S. Cl. X.R.

149—109